United States Patent [19]

Bauer et al.

[11] 4,246,696

[45] Jan. 27, 1981

[54] PROCESS FOR MANUFACTURING OPEN-AIR COMPOUND INSULATORS

[75] Inventors: Ewald Bauer, Wunsidel; Martin Kuhl, Selb, both of Fed. Rep. of Germany

[73] Assignee: Rosenthal Technik AG, Bavaria, Fed. Rep. of Germany

[21] Appl. No.: 951,865

[22] Filed: Oct. 16, 1978

[30] Foreign Application Priority Data

Oct. 19, 1977 [DE] Fed. Rep. of Germany ....... 2746870

[51] Int. Cl.³ ..................... H01B 19/04; H01B 19/00; H01B 17/04
[52] U.S. Cl. ..................................... 29/631; 174/179; 174/209; 264/251; 264/254
[58] Field of Search .................. 29/631; 264/251, 254; 174/31 R, 179, 140, 209; 428/429, 36

[56] References Cited

U.S. PATENT DOCUMENTS

| | | | |
|---|---|---|---|
| 2,601,337 | 6/1952 | Smith-Johannsen | 428/429 X |
| 3,134,164 | 5/1964 | Hocks | 29/631 |
| 3,557,447 | 1/1971 | Gruber et al. | 29/631 |
| 3,735,019 | 5/1973 | Hess et al. | 174/31 R |
| 4,045,604 | 8/1977 | Clabburn | 29/631 X |

FOREIGN PATENT DOCUMENTS

| | | | |
|---|---|---|---|
| 2650363 | 11/1977 | Fed. Rep. of Germany | 174/179 |
| 2657051 | 6/1978 | Fed. Rep. of Germany | 174/179 |
| 1182045 | 2/1970 | United Kingdom | 174/179 |
| 1292276 | 10/1972 | United Kingdom | 174/179 |

OTHER PUBLICATIONS

Chemie und Technologie der Silicone, edited by Walter Noll, 1968, pp. 338ff.

Primary Examiner—Francis S. Husar
Assistant Examiner—C. J. Arbes
Attorney, Agent, or Firm—Ostrolenk, Faber, Gerb & Soffen

[57] ABSTRACT

Open-air compound insulators are made treating a prefabricated glass-filter rod with silane, extruding a rubber layer on the rod, strengthening the rubber layer and bonding prefabricated screens to the rubber layer by vulcanization.

12 Claims, 2 Drawing Figures

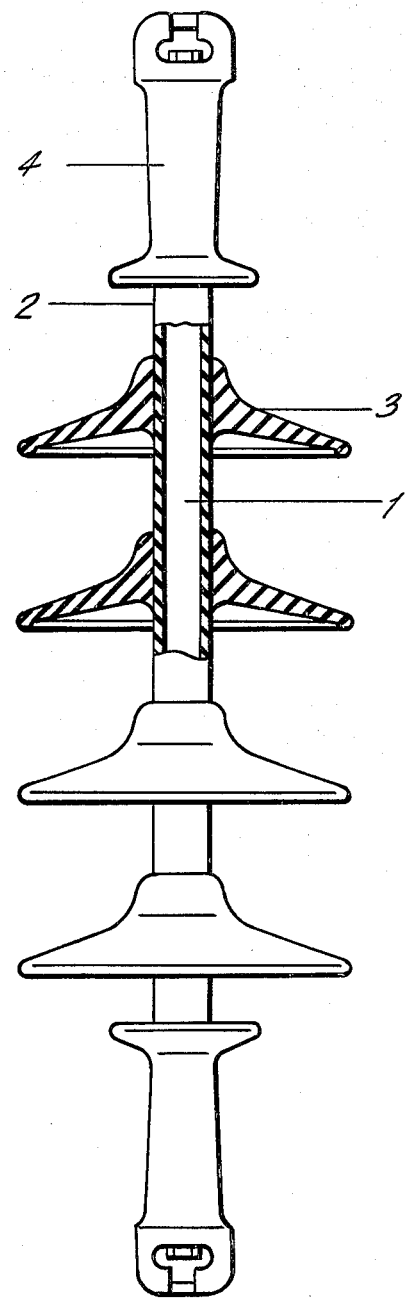
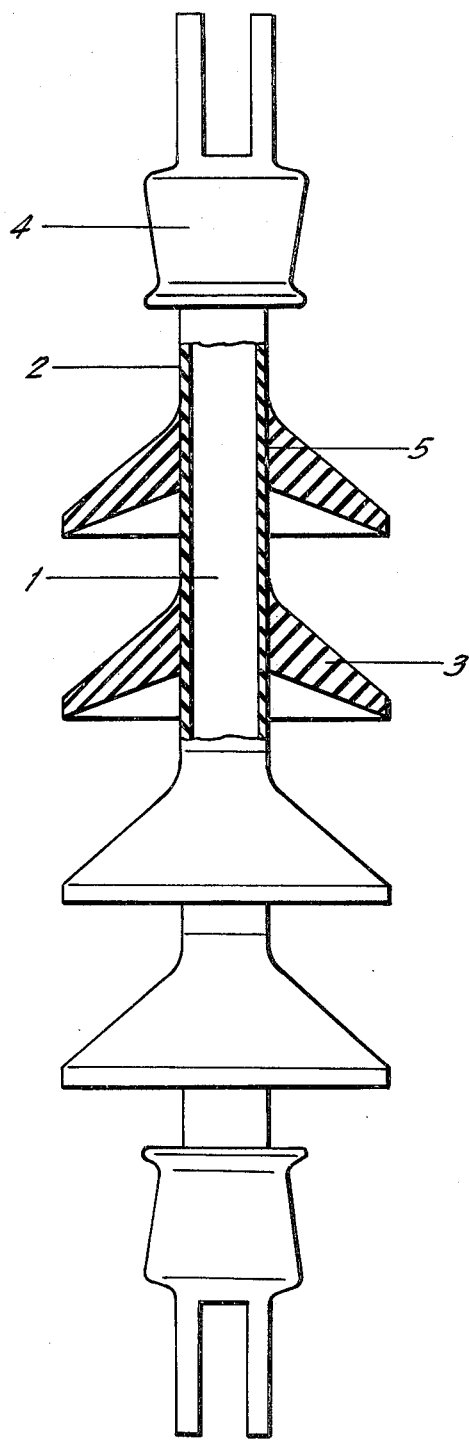

PROCESS FOR MANUFACTURING OPEN-AIR COMPOUND INSULATORS

BACKGROUND OF THE INVENTION

The invention relates to a process for manufacturing open-air compound insulators, particularly for use in areas having a high degree of atmospheric pollution.

Compound insulators have been known for a long time. Usually they comprise a mechanically high-strength, fiber reinforced synthetic core for absorbing mechanical loads, on which screens for avoiding weather factor produced electric spark-overs and suspension fittings for attaching insulators to transmission towers are mounted.

Compound designs of high-voltage open-air insulators have a number of considerable advantages over conventional insulators made of porcelain and glass which can be traced back to their design. With compound type insulators, electrical and mechanical functional area matching materials are used so that insulators as these can be economically feasible with a minimal material input. For this reason, compound insulators can be manufactured weighing substantially less than conventional insulators. They are more impact resistant than the latter, and maximal force applications are feasible. For use under maximal stresses, compound insulators can be designed also in one piece, which because of the low weight involved facilitates the design of open-air transmission towers.

But even high-voltage open-air compound insulators have their share of constructional and material selection problems. Because the compound zone between rod and screens is exposed to considerable electrical loads—the reason for this being that is runs parallel to the electrical field—measures must be taken for the prevention of electric sparkovers. Additionally, the coefficients of expansion of fiber reinforced rod and screens must be considered because in extreme cases, the operating temperatures may fluctuate between −50° C. and +80° C. Also wind and ice produced tractive forces, oscillations and abruptly added loads and their unloading effects produce additional tensions in the compound zone, which can result in electric sparkovers. Furthermore, weather and pollution produced moisture can penetrate the insulator. Specifically, electrical partial discharges on insulator surfaces require a specifically selected screen material, so that in avoiding operational sparkovers, no creep stresses are formed. Furthermore, a maximal type of operational safety and reliability ranging over decades is expected from high-voltage insulators so that the material selection, design and manufacturing of compound insulators must be very carefully done taking into account the economic aspects.

To solve this complex problem a large number of materials, designs and manufacturing processes have been practiced. Thus patent 963,115 proposes a compound insulator where the carrier rod is provided with a coating of fluorocarbon resin, and a screen made of a conductive material is attached. This insulator is not suitable as an open-air insulator for although the insulator stalk is partially protected against rain, or any open-air pollution of the insulator the stalk surface becomes partially conductive so that because of the omission of insulating material screens, which limit the effect of partial arc-overs, sparkovers can occur on the insulator.

British Pat. No. 1,292,276 describes an improved compound insulator made of a centrally arranged carrier, the outer surface of which is enveloped by a creep resistant material, over which thermally shrinkable prefabricated screens are slipped, which consist of a creep resistant material, and attached to the envelope of the carrier by means of heat meltable compounds. A substantial drawback of this proposed thermal shrink-on process is that the contraction strain of partially thermoplastic-formable materials is so minor that no pressing power can be effective between slipped-over screen and carrier envelope; as a result, small hollow spaces and gaps remain in the joint packing material so that diffused-in water can condense and result in electric spark-overs. This applies also to the coating on the carrier, which is attached in the same manner and means as the screens. Furthermore, the proposed material is very expensive and requires a high processing input.

Another process is described in DOS No. 2,254,468 U.S. Pat. No. 3,735,019, in which mutually overlapping butyl rubber screens are attached along the axis of the central, elongated main tube. The screens are prefabricated and slipped over said main tube by means of silicone grease. The drawback of this insulator is that the screens overlap each other, i.e., any leeway given in shaping the insulator is limited. Using this way to meet a requirement for more screens on the same insulator length, specifically on using said insulator under severely-polluted atmospheric conditions, requires an expensive second mold for manufacturing other screens. Even on optimizing the insulator for use in areas less endangered by external layers of pollution, where only a few screens are needed, again a new screen mold is required. Furthermore, under open-air conditions, the proposed butyl rubber screen material is susceptible to autoxidation because of any present double bonds, which reduces creep resistance. Also the proposed silicone grease intermediate layer is not resistant to saponification; in an electrical field, the silicone grease is decomposed by water diffused into the butyl rubber, so that the conductive products can initiate an electric spark-over between screen and carrier.

A further proposal published in British Pat. No. 915,052 is targeted to provide a glass fiber rod with a layer of creep resistant material, e.g., neoprene, butyl or silicone rubber, and with fluorocarbon resins. Proposed there is also that the layer be applied in an extrusion process. Further proposed as an alternative was also that elastically expanded tubes made of this material having an inner diameter less than that of the glass fiber rod be slipped over the glass fiber rod. So that no moisture can penetrate between rubber coating and suspension fitting, the material joint between rubber coating and suspension fitting is covered by a further flexible tube piece. It has been proposed also that on using silicone rubber on the material joint between the suspension fitting and rubber layer, a coil made of an elastomeric material and of a cotton tape be used as seal, whereby beneath the coil a thin elastomeric coating is present on the roughened, primer-pretreated silicone surface. But the proposed insulator has considerable drawbacks. The proposed measures taken for sealing the material joint between suspension fitting and rubber layer on the rod are ineffective. Because of the electrical field produced between the suspension fitting, an increased water vapor diffusion through the coating on the rod takes place. Because of the omission of an electrically leakproof transition layer, microsize hollow spaces are present in which water can condense, so that unavoidably joint sparkovers occur. This is not prevented even by the measure taken of shaping the rubber layer on the rod by power pressing or extruding it on because in any case, minimal gaps and hollow spaces cannot be avoided. The main drawback of the proposed insulator is a complete lack of screens so that the available standard insulator design-length rated creep age path is not sufficient at all. Moreover, an extension in length by a multiple of standard screen insulator length is required so that compared with screen insulators, a highly uneconomical design results.

The object of the invention, therefore, is to provide a manufacturing process of sparkover-proof compound insulators, whereby according to above outlined parameters, the above indicated design problems will also be eliminated from this type of insulator. An economic process of manufacturing such insulators is found by a selection of partially known processing steps and materials. Furthermore, sparkover-proof compound insulators are suitable for use specifically in highly polluted areas.

This problem is solved according to the invention by subjecting a prefabricated glass fiber rod to a surface treatment with silanes, by applying a rubber layer to the prepared glass fiber stalk by extrusion means, by strengthening the rubber layer, by slipping previously radial-expanded, prefabricated screens over the extruded coating, by vulcanizing, and by the subsequent attaching of fittings to the end of the glass fiber reinforced stalk.

Further advantages, features and potential applications of the novel invention are evident from exemplified embodiments and the following description.

According to the attached drawing,

FIG. 1 shows a cross-section through a compound insulator according to a first embodiment of the process, and FIG. 2 a cross-section through a compound insulator according to a second embodiment of the process.

Screens for open-air compound insulators are manufactured by conventional synthetic processing techniques, such as transfer molding or injection molding processes. These processes are fully automated and, therefore, highly economical.

In FIG. 1 such an insulator according to a first embodiment of the process is shown. The prefabricated glass fiber rod 1 is manufactured by a special pulling process (e.g., Pultrusion process), and consists, e.g., of epoxide resin with a matching percentage of E-glass filament. Furthermore, located on glass fiber rod 1 there is a (not-shown) bonding layer which is applied, e.g., by a dip tank or spraying process. Furthermore, the extrusion applied rubber layer 2 preferably has a thickness ranging from 1 to 10 mm. Such a layer 2 consists, e.g., of a current peak-proof and weather resistant envelope of silicone elastomers. Prefabricated screens 3, preferably manufactured of the same material as the rubber layer, then are slipped over glass fiber rod 1 with radial tension and subsequently vulcanized together. The body manufactured in this way is cross-linked according to rubber type under hot-air or pressure applicatory conditions, whereby screen and extrudate materials are so balanced that a cross-linkage between them is produced. With silicones, this can be done particularly well by selecting the appropriate catalytic systems, i.e., so that cross-linking effects are produced. At the ends of the compound insulator, metallic suspension fittings 4 are attached. They are applied, e.g., by fanning out the fiber reinforced stalk or forcing them on by pressure. Generally, it can be stated that by means of a surface pretreatment, a high-quality chemical bond is produced between prefabricated glass fiber rod and extruded rubber layer. By using high weathering resistant and current leak-proof, hot cross-linked silicone rubber as the core rubber layer and silanes, such a bond can be achieved.

The particular silane used depends on the particular rubber layer and its network (lattice-like polymerization) mechanism. For example, for silicone rubber (dimethylsiloxane) cross-linked with 2,4-dichlorobenzoylperoxide, the silane can be vinyltrichlorosilane, vinyltrimethoxysilane, vinyl trimethoxyethoxysilane or vinyltriethoxysilane, and for ethylene-propylene terpolymer cross-linked with dicumylperoxide, the silane can be vinyltriethoxysilane, α-methacryloxypropyltrimethoxysilane, α-aminoisopropyltriethoxysilane, or N-β-aminoethyl-α-aminopropyltrimethoxysilane.

For still more increased adhesive effects it is preferred to treat the roughened surface of glass fiber rod 1 with a dispersion of a solvent and a silicone rubber prior to starting the extrusion process. The purpose of the strengthening process is to prevent the mechanical destruction of the extrudate when slipping radially prestressed, cross-linked screens over the non-cross-linked extrudate. The state of the strengthened rubber layer is such that a cross-linking with previously slipped-over screens can be accomplished. The strengthening of the extrudate can be carried out, e.g., by incorporating pyrogenic-obtained silicic acid in the rubber, which produces a thixotropic effect as a function of time. Another feasible procedure is to store the extrudate at elevated temperatures and to use various cross-linkers with differential starting temperatures.

Compound insulators manufactured according to the invention are particularly electric-sparkover-proof because between fiber reinforced stalk and extrudate, and between extrudate and slipped-over screens, a chemical bond of various materials is present. Mechanical expansions of the glass fiber rod are transferred to the rubber without the rubber detaching itself from the stalk surface. The differential coefficients of expansion between rubber and rod are such that in any shift no gaps or hollow spaces can be formed in which diffused-in water can condense. By correctly selecting the materials for the prefabricated glass fiber rod and the screens, which on the one hand are composed from non-saponifiable alkali-free constituents and on the other hand are also current leak-and weather resistant, the insulator according to the invention meets all operational requirements. Furthermore, the industrial manufacture of such an insulator is inexpensive because the rubber coating on the rod can be produced by automated means. The shiftability of screens provides a sufficiently large leeway in designing insulators so that such a compound insulator can be optimally adapted to specific atmospheric requirements.

A manufacturing variant is shown in FIG. 2. An insulator according to the invention is obtained, whereby on the prefabricated glass fiber rod 1, a (not-shown) bonding layer as described above is applied between the surface of the glass fiber rod and a subsequently-to-be attached rubber layer 2, which preferably consists of a current leak-and weathering resistant elastomer, e.g., silicone. The extrudate is cross-linked immediately after the extrusion process. Subsequently, the prefabricated screens in an expanded state are slipped over the extrudate under radial tension by means of a slideable, electrically high-rated joint sealant material 5 of pasty consistence. A reliably tested joint sealant 5 is a silicone paste on the basis of polyorgano dimethyl-siloxanes with dispersed silicic acid, the constituents of which are non-saponifiable and, therefore, are not split up under water effects. Preferably, the basic polymer comprises poly dimethylsiloxanes, which contain a percentage of vinyl groups, so that cross-linking between the silicone rubber layer and the slipped-over silicone screens can be carried out by a rectroactive thermal treatment. The proportion of vinyl groups depends on the surfaces to be connected, i.e., which rubbers are to be connected, and the processing speed. For customary rubber systems and reasonable process speeds, between 5 and 200 vinyl groups per 1000 dimethylsiloxane units is expedient. Following the slip-over of the screens, the free-kept ends of the glass fiber rod are provided with fittings according to known techniques.

Insulators according to this process are absolutely sparkover-proof also at the point between extrudate and glass fiber rod. The advantages of this process are found in a higher degree of economization as they can be manufactured to a great extent in an automated process and any design changes can be effected as rapidly as required. This process differs from first-described process to the extent that compound insulators can be manufactured where a chemical bonding of screens to the extrudate cannot be effected because of the nature of materials involved. On operating insulators as these, however, only in the rarest cases can a screen sparkover be expected. The insulator function is not impaired to any considerable degree based on a larger amount of screens because the glass fiber rod is not attacked on account of its enveloping rubber layer solidly bonded to it. Insulators according to said second process can be advantageously used in low-pollution endangered areas, e.g., with coating conductivities up to 40-micron layers. No danger of any electric sparkover exists. Because of the low material costs of these insulators, there is also an effective price reduction. Because until now compound insulators have been used primarily on high-voltage applications, this insulator type is favored pricewise also for open-air compound insulator applications to low operating voltages. Thus with insulators as these, the screens can be designed of materials such as ethylene-propylene rubber (EPR) in various modifications.

It should be noted also that, in principle, with both processes the screens can be shaped in any given way, i.e., with various screens slants or subscreens, so that with only a few screens a relatively long creepage path can be effected. Because all screens are prefabricated they have no lengthwise seams which favor dirt deposits and high creepage currents. A further feature of the invention, is that of ring-shaped bulges on the glass fiber rod.

What is claimed is:

1. A process for manufacturing a sparkover-safe, open air compound insulator consisting essentially of surface treating a prefabricated glass fiber rod with a silane, extruding a rubber layer on said treated rod, strengthening said rubber layer, assembling radially preexpanded prefabricated screens to said rod and vulcanizing said assembly.

2. Process according to claim 1, characterized in that to increase the adhesive power of the bonding by silanes, a dispersion of a solvent and a silicone rubber is applied prior to the extrusion to the surface of prefabricated glass fiber rod, and in that said surface is roughened.

3. Process according to claim 1, characterized in that the means used for strengthening the extruded layer comprises pyrogenically obtained silicic acid being present in said layer and aging said extruded layer.

4. Process according to claim 1, characterized in that the means used for strengthening said extruded rubber layer is at least two cross-linking agents having differential starting temperatures being present in said layer and subjecting said extruded layer to an elevated temperature.

5. Process according to claim 1 characterized in that fittings are attached to the ends of the glass fiber rod.

6. Compound insulator according to claim 7, characterized in that the thickness of extruded rubber layer on the fiber reinforced rod ranges from 1 to 10 mm.

7. Open-air compound insulator for use in external layer-endangered high-voltage installations having pollution limits rated at coating conductivities exceeding 40-micron layers characterized by a silane treated prefabricated glass fiber rod, a strengthened extruded rubber layer vulcanized on said rod, and a plurality of pre-expanded prefabricated screens vulcanized on said extruded layer.

8. Compound insulator according to claim 7, characterized in that rubber layer and screens are of the same material of construction.

9. Compound insulator according to claim 8 characterized in that said rubber and screens are made of a hot cross-linked silicone rubber.

10. Open-air compound insulator for use in areas having coating conductivities of less than 40-micron layers according to claim 7, characterized in that extruded rubber layer is present in a cross-linked state and at the screen and rubber layers joint is means of a slideable, electrically high-rated sealant material of paste-like consistency.

11. Compound insulator according to claim 10, characterized in that extruded rubber layer is a hot cross-linked silicone rubber and that said screens are manufactured from an ethylene-propylene rubber.

12. Compound insulator according to claim 10 characterized in that the joint-sealant material of paste-like consistency used in a vinyl group containing poly dimethylsiloxane, which is filled with high-dispersive silicic acid.

* * * * *